United States Patent Office 3,224,941
Patented Dec. 21, 1965

3,224,941
RESIN COMPOSITIONS AND METHOD FOR
CONTROLLING DIARRHEA
J Frank Nash and Tsung-Min Lin, Indianapolis, Ind., assignors to Eli Lilly and Company, Indianapolis, Ind., a corporation of Indiana
No Drawing. Filed Jan. 21, 1963, Ser. No. 252,569
9 Claims. (Cl. 167—55)

This invention relates to therapeutic compositions, their preparation, and their use. More particularly this invention relates to therapeutic compositions and their use in the treatment of diarrhea.

Diarrhea is encountered in both acute and chronic forms. The former is frequently associated with infections such as bacillary dysentery, amebic dysentery, typhoid fever, trichinosis, brucellosis, acute ulcerative colitis, and the like. Acute diarrhea is also one of the earliest symptoms resulting from the very serious food poisoning which can occur as the result of the ingestion of foods containing naturally occurring poisons, such as certain species of mushrooms, or as the result of the consumption of improperly prepared foods containing the toxin produced by *Clostridium botulinum*, one of the most deadly bacterial toxins. Possibly the most familiar type of acute diarrhea is that caused by the ingestion of food or drink containing the toxins produced by the Salmonella group of organisms and by *Staphylococcus aureus*. Usually such food has been handled or stored under conditions favorable to the growth of a toxin-producing organism.

Chronic diarrhea may be associated with a variety of diseases, many being extraintestinal and involving the gut only symptomatically. Thus for example chronic diarrhea may occur as a symptom in gastritis, parasitism, deficiency states, hyperthyroidism, malignant conditions, diabetes mellitus, allergy, or even nervous and emotional conditions.

The therapy of either acute or chronic diarrhea should be directed ultimately toward the detection and treatment of the underlying cause. However, in both acute and chronic diarrhea, it is highly desirable to initiate symptomatic treatment as quickly as possible while the diagnosis is being made and specific therapy of the underlying cause is begun in order to avoid the sequelae of the diarrhea itself, such as dehydration, prostration, and the like.

It is an object of this invention to provide a therapeutic composition for the treatment of diarrhea which can be administered orally but is not absorbed from the gastrointestinal tract. A further object of this invention is to provide such a therapeutic composition which is not only capable of providing symtomatic relief but, because of its ability to adsorb and detoxify a broad spectrum of toxins and toxin-producing organisms, also provides specific therapy for a number of diarrhea-producing conditions. Still another object is to provide a method for treating both acute and chronic diarrhea. These and other objects and advantages of the invention will become apparent from the specification.

In accordance with the invention, there is provided a method for the treatment of acute or chronic diarrhea which comprises the administration of an effective amount of a composition containing as an active ingredient thereof, a copolymer of maleic anhydride and a terminally unsaturated lower olefin or olefinic ether of the formula R—CH=CH$_2$, wherein R is selected from the group consisting of hydrogen, lower alkyl containing from one to five carbon atoms, and lower alkoxy containing from one to three carbon atoms. Illustrative of the terminally unsaturated monomers which can be employed in the preparation of the copolymer with maleic anhydride are ethylene, propylene, isobutylene, diisobutylene, butene-1, methyl vinyl ether, ethyl vinyl ether, and the like. A preferred copolymer is that derived from maleic anhydride and ethylene. In addition, the copolymers employed in this invention can contain up to about 3 percent, preferably about 1 percent, by weight of a polymerizable vinyl or vinylidene compound to serve as a modifying or cross-linking agent. The nature of the cross-linking agent is not critical, but exemplary compounds suitable for this purpose are styrene, methyl methacrylate, vinyl acetate, vinyl crotonate, and the like, vinyl crotonate being especially preferred. Thus, an especially preferred composition is a copolymer of ethylene and maleic anhydride comprising about 1 percent of vinyl crotonate as a cross-linking agent. For convenience the cross-linked copolymers employed in this invention will be referred to herein as cross-linked olefin-maleic anhydride copolymers or simply as cross-linked copolymers.

The cross-linked olefin-maleic anhydride copolymers employed in this invention form thixotropic aqueous solutions at all pH values and are characterized by having, as 1 percent aqueous solutions adjusted to pH 9, viscosities ranging from about 10,000 to about 100,000 centipoises, preferably between about 25,000 and 50,000 centipoises, determined at about 25° C. with a Brookfield Viscosimeter, Model LVF4, using a No. 4 spindle at 6 r.p.m. The cross-linked olefin-maleic anhydride copolymers may be employed without further modification, or, if desired, they may be partially hydrolyzed so that up to about 95 percent of the anhydride residues have been hydrolyzed to yield free carboxyl groups. The copolymers containing free carboxyl groups produce aqueous solutions which have substantially lower viscosities than the solutions made from the unhydrolyzed copolymer having the same degree of polymerization. It is considered quite likely that during the hydrolysis of the cross-linked copolymers in which an ester has been employed as a cross-linking agent, a considerable reduction in the degree of cross-linking occurs through hydrolysis of the ester groups. This does not appear to affect adversely the antidiarrheal properties of these copolymers.

The copolymers employed in this invention are easily prepared by methods now well known in the art. In one suitable method, maleic anhydride is reacted in the presence of a peroxide catalyst with a terminally unsaturated lower olefin or olefinic ether as disclosed above in a suitable organic solvent compatible with the peroxide and in which the monomers are soluble but from which the copolymers precipitate. Such solvents should, of course, be inert to the reactants employed, and be readily removed from the reaction product. Among the solvents suitable for the reaction are benzene, toluene, xylene, cyclohexane, methylcyclohexane, acetone, dioxane, saturated petroleum hydrocarbons and the halogenated derivatives thereof, such as for example ethylene chloride, and the like. In general, the catalyst may be any peroxide soluble in the reaction medium, although benzoyl peroxide is a preferred catalyst. Other peroxide catalysts may be employed, however, including acetyl peroxide, butyryl peroxide, succinyl peroxide, lauroyl peroxide, cumyl peroxide, and the like. Copolymers with modified properties are prepared by incorporating therein up to about 3 percent, and preferably about 1 percent, of a suitable modifying or cross-linking agent. The copolymers so obtained contain substantially equimolar proportions of the olefin residue and the maleic anhydride residue with lesser quantities of a third component if a modifying or cross-linking agent is employed.

The preparation of a typical cross-linked copolymer is carried out as follows: To a solution containing about 45 parts of maleic anhydride and about 2.2 parts of benzoyl peroxide in about 250 parts of toluene there is added about 1 part of vinyl crotonate. The mixture is then introduced into an autoclave so designed as to permit the introduction of a gas, and ethylene is passed into the reaction mixture until the increase in weight is about 40 parts. Gradual heating of the autoclave is then begun, whereupon an exothermic reaction takes place and the temperature rises rapidly to about 150° C. The autoclave is maintained at this temperature for about an hour, after which the contents of the autoclave are cooled and the copolymer of maleic anhydride and ethylene, cross-linked with vinyl crotonate, is separated by filtration and dried. The viscosity of the copolymer, determined as disclosed above, is in the range of 25,000 to 50,000 centipoises.

Alternatively, a linear copolymer of maleic anhydride and ethylene can be prepared essentially as described above, the vinyl crotonate being omitted. This linear copolymer can then be cross-linked by heating in a suitable reaction medium with about 1 percent by weight of vinyl crotonate.

Partial hydrolysis of the copolymers can be carried out as follows if desired: A suspension of about 50 g. of the copolymer obtained as described above in about 300 ml. of ethylene dichloride is stirred under reflux while about 3 ml. of water are added dropwise during about four hours. The reaction mixture is cooled and filtered to obtain a partially hydrolyzed copolymer in which about 15 percent of the anhydride residues have been hydrolyzed, as indicated by infrared analysis.

The degree of hydrolysis can be governed by controlling the amount of water employed. Thus, in the illustration just given, a copolymer in which about 95 percent of the anhydride residues have been hydrolyzed can be prepared by increasing the volume of water employed to about 30 ml.

The cross-linked olefin-maleic anhydride copolymers of the present invention are suitable for oral administration, either unmodified or in their partially hydrolyzed form. Moreover, these copolymers can be administered as such without diluents or excipients, as for example by including the copolymer in a capsule.

Alternatively, and preferably, the copolymers of this invention can be compounded with one or more pharmaceutically acceptable excipients, in which form they can be filled into capsules or made into tablets, preferably of a chewable type, or pharmaceutical suspensions suitable for oral administration. In addition, of course, the compositions employed in this invention can be utilized in combination with other active ingredients such as anticholingergic agents, antispasmodics, and the like.

The antidiarrheal compositions employed in this invention have an extremely low toxicity and have a pH which corresponds to that normally encountered in the stomach. Consequently, they can be administered in the relatively large doses normally employed in the treatment of diarrhea without interfering with the normal digestive processes and with no toxic effects. The compositions have an enormous capacity for water absorption, being capable of absorbing up to about 200 times the weight of the cross-linked copolymer employed while still retaining their gel-like properties.

An outstanding advantage of the cross-linked copolymers employed in this invention lies in their ability to remove not only large quantities of water but also the enterotoxins which are frequently the causative agents producing the diarrhea. The cross-linked copolymers of this invention are capable of adsorbing and detoxifying a board spectrum of enterotoxins and enterotoxin-producing organisms. Thus for example, these compositions are able to detoxify the toxins produced by *Staphyloloccus aureus, Clostridium botulinum,* and *B. typhosus.* The compositions have also been shown to adsorb certain viruses, as for example polio virus type I.

In addition to the detoxifying effect produced by the adsorption of the enterotoxins and enterotoxin-producing organisms by the cross-linked copolymers, the compounds exhibit a true antibacterial action against a broad spectrum of bacterial organisms under conditions which would not permit adsorption of the bacteria. Thus, for example, the cross-linked copolymers in concentrations of about 4 to 6 mg./ml. of hardened agar are completely bactericidal to *E. coli, B. subtilis, Salmonella typhimurium,* several strains of Enterococcus, and a strain of Staphylococcus which was resistant to all of the major antibiotics.

The antibacterial activity and ability of the anti-diarrheal compositions employed in this invention to detoxify enterotoxins provides an economic advantage since it is possible to employ only one active ingredient in situations which commonly require at least two and possibly more active substances. Furthermore, these properties of the instant copolymers render their use in the treatment of diarrhea more than merely symptomatic therapy. The bactericidal activity and the ability to remove enterotoxins and viruses provide specific therapy in conditions in which the diarrhea is produced by these causative agents. There is thus the added advantage of permitting specific therapy even while the complete diagnosis is being made.

Still another distinct advantage of the copolymers employed in this invention stems from their nontoxic nature. The fact that prolonged administration of large doses of the compounds fails to produce constipation and that even massive doses fail to elicit any manifestations of toxicity or undesirable side effects permits considerable latitude in the dosage administered. The nontoxic nature of the compositions is dramatically illustrated by the results of toxicity studies with the cross-linked ethylene-maleic anhydride copolymers in both rats and dogs. The acute oral toxicity in rats, expressed as $LD_{50}$, is within the range of about 2500 to about 3000 mg./kg. In chronic toxicity studies, rats receiving the cross-linked copolymers in amounts as high as 1 percent of their normal diet for over a year showed no decrease in weight and neither gross nor microscopic abnormalities. Dogs receiving the cross-linked copolymers orally in doses as high as 200 mg./kg. for over a year have likewise shown no evidence of adverse effects. Long-term studies with dogs receiving up to 200 mg./kg. of the copolymers orally have shown that serum sodium and potassium levels remain within normal limits, indicating that the compound does not disturb the electrolyte balance.

This description is directed primarily toward copolymers of maleic anhydride and terminally unsaturated olefins which have been cross-linked with a suitable cross-linking agent, inasmuch as these cross-linked copolymers constitute a preferred embodiment of the invention; it is to be understood, however, that the linear copolymers without cross-linking are in many instances fully equivalent to the cross-linked derivatives as autidiarrheal agents and are included within the scope of this invention. Such linear copolymers can have specific viscosities ranging between about 0.1 and 1.5, determined at 25° C. on 1 percent solutions of the copolymers in dimethylformamide. As in the case of the cross-linked copolymers, the linear copolymers can be partially or substantially completely hydrolyzed without loss of antidiarrheal properties.

The antidiarrheal compositions of this invention are suitably administered orally as tablets containing about 500 mg. of the active ingredient. As employed in the treatment of acute diarrhea, the dosage is commonly three tablets at the begining of treatment, followed by two tablets given at the time of each watery stool. On the average, the diarrhea is controlled after the administration of five to seven tablets. In the treatment of chronic diarrhea, the usual dosage is one or two tablets given four times daily. The average patient is controlled with six to eight tablets per day.

Although the medication is preferably administered in tablet form, other dosage forms, such as filled capsules, oral suspensions, and the like, can also be employed. In such instances, the dosage is usually adjusted to provide about the same amount of the active constituent as disclosed above.

In order to describe more fully the operation of the invention, the following examples are provided by way of illustration.

*Example 1*

Chewable tablets suitable for the treatment of diarrhea are prepared using the following ingredients in the proportions given:

| | Grams |
|---|---|
| Cross-linked copolymer | 2500 |
| Sodium cyclamate | 500 |
| Sodium citrate | 400 |
| Sodium chloride | 250 |
| Monosodium glutamate | 50 |
| Orange flavor | 67.5 |
| Vanillin | 7.5 |
| Magnesium stearate | 100 |
| FD and C Yellow No. 5 | 1.6 |
| FD and C Red No. 4 | 3.4 |
| Mannitol | 6120 |

The ingredients, except for the magnesium stearate, are mixed thoroughly in a ball mill to provide a homogeneous blend. About one half of the magnesium stearate is added, and the mixture is again mixed thoroughly. The mixture is then slugged and allowed to age for several hours, after which the slugs are broken and put through a 20-mesh sieve. The remainder of the magnesium stearate is added, and, after thorough mixing, the mixture is compressed into tablets weighing about 2 grams each and containing about 500 mg. of the cross-linked copolymer per tablet.

The ingredients in the above formulation can be varied somewhat, if desired, without affecting adversely the antidiarrheal properties of the tablets. Thus, for example, the sodium cyclamate can be replaced by saccharin or other suitable sweetening agents. The sodium citrate, sodium chloride, and monosodium glutamate can be replaced by other taste potentiating agents or can even be omitted entirely. Other flavoring agents such as wild cherry, raspberry, strawberry, lemon, lime, and the like, alone or in combination, can be employed in place of the orange flavor and vanillin. Nontoxic food-coloring dyes other than those listed can be employed, or the tablets can be compounded without the addition of coloring substances. Talc, stearic acid, and the like can be substituted for the magnesium stearate to serve as tablet lubricants. Finally, the mannitol can be replaced by other pharmaceutically acceptable extending agents such as sucrose, lactose, starch, sorbitol, microcellulose, and the like.

*Example 2*

An oil suspension of a maleic anhydride-ethylene copolymer cross-linked with about 1 percent of vinyl crotonate, suitable for oral administration, is prepared as follows: To 400 ml. of Drew Oil 1400 (an alcohol soluble modified triglyceride derived from coconuts) are added 120 g. of the cross-linked copolymer. The mixture is blended to obtain a paste of smooth consistency. To the pasty mixture are added, with thorough mixing, a solution of 1 g. of saccharin in 10 ml. of grain alcohol, 0.05 g. of butyl p-hydroxybenzoate, 0.1 g. of methyl p-hydroxybenzoate, and Drew Oil 1400 in an amount sufficient to make the total volume 1000 ml. Each teaspoonful of this preparation contains about 600 mg. of the antidiarrheal compound.

Other suspending vehicles can be employed in place of the Drew Oil 1400, provided that they are nonirritating to the gastric mucosa.

*Example 3*

Capsules containing 300 mg. of active constituent are prepared by mixing thoroughly 300 parts of a copolymer of maleic anhydride and propylene cross-linked with about 1 percent of vinyl crotonate, the said copolymer having been partially hydrolyzed so as to convert 20 percent of the anhydride residues to free carboxyl groups, with 15 parts of paraffin oil and 70 parts of starch powder and filling the mixture into number zero clear capsules at the rate of 385 mg. of the homogeneous mixture per capsule.

*Example 4*

Chewable tablets comprising, as the active ingredient thereof, a copolymer of maleic anhydride and ethylene cross-linked with about 1 percent of vinyl crotonate were employed in a study with 33 patients suffering from diarrhea in a home for the aged. Patients ranged in age between 67 and 101 years. The group included 6 men and 27 women. Patients were given two or three tablets at the onset of diarrhea and two tablets at the time of each watery stool. In most cases, a single dose was sufficient to change foul-smelling, watery stools to formed stools having a soft consistency and little or no odor. A rectal digital examination performed on each person was carried out to rule out the presence of fecal impaction.

Four of the patients were maintained on daily doses of the drug, averaging five to six tablets per day, for six to nineteen days. Throughout the treatment these patients continued to have soft or normal stools, and the use of laxatives was not required in any instance. The patients continued to have normal stools after medication was discontinued.

*Example 5*

The antibacterial activity of a copolymer of maleic anhydride and ethylene cross-linked with about 1 percent of vinyl crotonate and having a viscosity of about 45,000 centipoises determined as described herein, was demonstrated against several bacterial strains as follows: Preparations of warm liquid agar containing 4 and 6 mg. of the copolymer per milliliter of agar were made, and the warm agar was then poured onto culture plates and allowed to harden. The plates were then inoculated with 0.5 ml. per plate of a bacterial culture adjusted so as to contain 10 billion cells per milliliter of culture. The plates were incubated, and cell growth was determined 16 hours later by washing the cells off the plates with 10 ml. of a saline solution and measuring cell concentrations turbidimetrically. Results with four bacterial strains are shown in the chart below.

| Bacterial strain | Concentration of copolymer, mg./ml. of agar | Cell growth, billion cell/ml. |
|---|---|---|
| Enterococcus Strain 9913 | 6 | 0 |
|  | 4 | 0 |
|  | 0 | 29.0 |
| Enterococcus Strain 238 | 6 | 0 |
|  | 4 | 3.4 |
|  | 0 | 32.0 |
| Salmonella typhimurium Strain B-4 | 6 | 0 |
|  | 4 | 1.3 |
|  | 0 | 176.0 |
| Staphylococcus Strain H-232 | 6 | 0 |
|  | 4 | 17.2 |
|  | 0 | 120 |

*Example 6*

The copolymer employed in Example 5 was tested for its ability to adsorb or inactivate type I polio virus as follows: A total of 3 g. of the copolymer was added to 100 ml. of a virus preparation and the mixture was incubated at 37° C. with occasional agitation for a total of five hours. The incubate was centrifuged to facilitate sedimentation of the solid phase, and the virus content of the supernatant fluid was determined by assay. An untreated control sample had a virus titer of $10^{6.71}/0.5$ ml. The treated sample had a virus titer of less than $10^{3.5}/0.5$ ml., thus indicating that at least 99.2 percent of the virus was adsorbed or inactivated.

We claim:

1. A method for controlling diarrhea which comprises orally administering to a subject suffering from diarrhea a therapeutically effective amount of a copolymer of maleic anhydride, a terminally unsaturated olefinic compound of the formula $$R\text{—}CH=CH_2$$

wherein R is a member of the group consisting of hydrogen, $C_1$–$C_5$ alkyl, and $C_1$–$C_3$ alkoxy, and a cross-linking agent selected from the group consisting of polymerizable vinyl and polymerizable vinylidene compounds, said copolymer having a viscosity between about 10,000 and about 100,000 centipoises in 1 percent aqueous solution at 25° C. and pH 9.

2. A method as in claim 1 wherein said copolymer has been partially hydrolyzed, prior to administration, to convert up to about 95 percent of the anhydride residues therein to carboxyl groups.

3. A method of treating diarrhea which comprises the oral administration to a subject suffering from diarrhea of a therapeutically effective amount of a copolymer of maleic anhydride and ethylene cross-linked with about 1 percent of vinyl crotonate, said copolymer having a viscosity between about 10,000 and about 100,000 centipoises as a 1 percent aqueous solution adjusted to pH 9.

4. The method of claim 3 wherein said copolymer has a viscosity between about 25,000 and about 50,000 centipoises.

5. The method of claim 3 wherein said copolymer has been partially hydrolyzed so as to convert between about 5 and about 25 percent of the anhydride residues therein to carboxyl groups.

6. An antidiarrheal composition in dosage form comprising a copolymer of maleic anhydride, a terminally unsaturated olefinic compound of the formula $$R\text{—}CH=CH_2$$

wherein R is a member of the group consisting of hydrogen, $C_1$–$C_5$ alkyl, and $C_1$–$C_3$ alkoxy, and a cross-linking agent selected from the group consisting of polymerizable vinyl and polymerizable vinylidene compounds, said copolymer having a viscosity between about 10,000 and about 100,000 centipoises in 1 percent aqueous solution at 25° C. and pH 9, in combination with a sweetening agent, a flavoring agent, and a pharmaceutical extending medium.

7. An antidiarrheal composition in tablet form comprising a maleic anhydride-ethylene copolymer cross-linked with about 1 percent of vinyl crotonate, said polymer having a viscosity in the range of about 25,000 to about 50,000 centipoises as a 1 percent aqueous solution adjusted to pH 9, in combination with a sweetening agent, a flavoring agent, a tablet lubricant, and a pharmaceutical extending medium.

8. An antidiarrheal composition in tablet form comprising a maleic anhydride-ethylene copolymer cross-linked with about 1 percent of vinyl crotonate, said polymer having a viscosity in the range of about 25,000 to about 50,000 centipoises as a 1 percent aqueous solution adjusted to pH 9, in combination with sodium cyclamate, sodium citrate, sodium chloride, monosodium glutamate, orange flavor, vanillin, magnesium stearate, and mannitol.

9. An antidiarrheal composition suitable for use as an oral suspension comprising a maleic anhydride-ethylene copolymer cross-linked with about 1 percent of vinyl crotonate, said polymer having a viscosity in the range of about 25,000 to about 50,000 centipoises as a 1 percent aqueous solution adjusted to pH 9, in combination with a liquid suspending vehicle bland to the gastric mucosa, a sweetening agent, and a flavoring agent.

References Cited by the Examiner

UNITED STATES PATENTS

| | | | |
|---|---|---|---|
| 2,798,053 | 7/1957 | Brown | 167—56 |
| 2,909,462 | 10/1959 | Warfield | 167—56 |
| 2,923,692 | 2/1960 | Ackerman | 167—56 |
| 2,980,655 | 4/1961 | Glass | 167—56 |
| 3,158,538 | 11/1964 | Lee | 167—55 |

JULIAN S. LEVITT, *Primary Examiner.*

FRANK CACCIAPAGLIA, JR., *Examiner.*